United States Patent
Dickson et al.

(10) Patent No.: US 7,000,625 B2
(45) Date of Patent: Feb. 21, 2006

(54) SUNSHADE ATTACHMENT FOR STROLLERS, CAR SEATS, CARRIAGES AND JOGGERS

(75) Inventors: Karen Joan Dickson, Windsor Downs (AU); Rachel Blakeman, New York, NY (US)

(73) Assignee: Protect-A.Bub USA, LLC, New York, NY (US)

( * ) Notice: Subject to any disclaimer, the term of this patent is extended or adjusted under 35 U.S.C. 154(b) by 3 days.

(21) Appl. No.: 10/453,506

(22) Filed: Jun. 4, 2003

(65) Prior Publication Data

US 2004/0244301 A1    Dec. 9, 2004

(51) Int. Cl.
  *B60J 9/00*    (2006.01)
  *B60J 3/00*    (2006.01)
  *B62B 9/14*    (2006.01)

(52) U.S. Cl. .................. 135/88.02; 135/93; 296/97.21; 296/77.1; 296/107.2; 297/184.11; 297/184.13; 297/184.15

(58) Field of Classification Search ............. 135/88.02, 135/93, 96, 94, 33.7; 5/416; 297/184.11, 297/184.13, 184.15; 296/77.1, 107.2; 2/172, 2/204, 410, DIG. 1
See application file for complete search history.

(56) References Cited

U.S. PATENT DOCUMENTS

| | | | | |
|---|---|---|---|---|
| 3,011,824 A * | 12/1961 | Vassallo et al. | ............. | 296/102 |
| 3,356,098 A * | 12/1967 | Krutzikowsky | ............... | 135/93 |
| 3,800,814 A * | 4/1974 | Hibbert | ..................... | 135/93 |
| 4,096,874 A * | 6/1978 | Weatherly | .................. | 135/124 |
| 6,224,073 B1 * | 5/2001 | Au | ......................... | 280/47.38 |
| 2002/0029528 A1 * | 3/2002 | Kendro, Jr. | ..................... | 52/4 |

* cited by examiner

Primary Examiner—Robert Canfield
(74) Attorney, Agent, or Firm—Christopher & Weisberg, P.A.

(57) ABSTRACT

This invention is the only sun protection cover to fit strollers, carriages, joggers and baby/toddler car seats. The design and fabric combination allows babies and toddlers visibility and maximum protection while at the same time providing excellent front and cross ventilation. On a windy day, when using the cover attached to carriage, stroller or jogger, the cover continues to maintain its shape, essential to providing continued UVR protection for the baby or toddler.

9 Claims, 1 Drawing Sheet

SUNSHADE ATTACHMENT FOR STROLLERS, CAR SEATS, CARRIAGES AND JOGGERS

BACKGROUND OF THE INVENTION

According to the American Cancer Society, limiting children's exposure to the sun reduces children's risk of skin cancer in later life. Skin cancer is the most common preventable cancer in the United States, affecting approximately 1,000,000 people every year. Despite the prevalence of skin cancer in the United States, adequate sun protection measures were unavailable for babies and toddlers. Many pediatricians advise against using sunscreen on babies younger than 6 months of age, leaving parents with fewer means to protect their children from the sun.

Strollers, prams, joggers and car seats do not provide adequate UV protection. Those that have built in covers or hoods do not adequately protect from sun exposure. In recent years, as people have become aware of the importance of sun protective measures, there have been covers marketed as sunshade covers. However, many of these covers, despite the marketing claims do not provide adequate UV protection.

Most cloth and mesh products do not provide UPF 50+ protection other than the few made from cloth that is above 93% UPF. In addition, the mesh shades, because they are mostly made from plastic based material, do not prevent areas from becoming too warm for the baby. While some Nylon/Lycra products provide UPF 50+, they do not return to their original UPF 50+ protection after stretching. This leaves babies and toddlers at greater risk of sun exposure. In addition, these products are not made from breathable fabric. Slight wind blows these products leaving the baby and toddler exposed to the sun until a person physically returns the product to its original position.

This invention returns to its original UPF protection after stretching, prevents areas from becoming too warm for the baby and toddler and is made from a breathable fabric. In addition, it maintains its position in light to moderate wind conditions and returns to its original position following a strong gust of wind. No other product is versatile for use on a stroller, jogger, car seat and pram. As a result of the inventors' collaborative efforts, this invention significantly improves upon other products, as well as U.S. Pat. No. 6,012,756, owned by Karen Clark-Dickson.

BRIEF SUMMARY OF THE INVENTION

The cover is made from UPF 50+ rated stretch knit/woven fabric with triangular translucent mesh sides.

The design and fabric combination allows babies and toddlers visibility and maximum protection while at the same time providing excellent front and cross ventilation (provided by the translucent mesh sides).

The cover is attached to the hood of the stroller, carriage or jogger via fabric ties, Velcro or elastic straps or hook and loop. The cover extends down or forward ending in a shaping component (pvc coasted wire, malleable wire, stretch wire, casing) that forms a frustum shape. The design, fabric and shaping component increases stability against the wind. On a windy day, when using the cover attached to carriage, stroller or jogger, the cover continues to maintain its shape, essential to providing continued UVR protection for the baby or toddler.

It is the only cover of its kind to fit strollers, carriages, joggers and baby/toddler car seats.

DETAILED DESCRIPTION OF THE DRAWINGS

Figure 1:
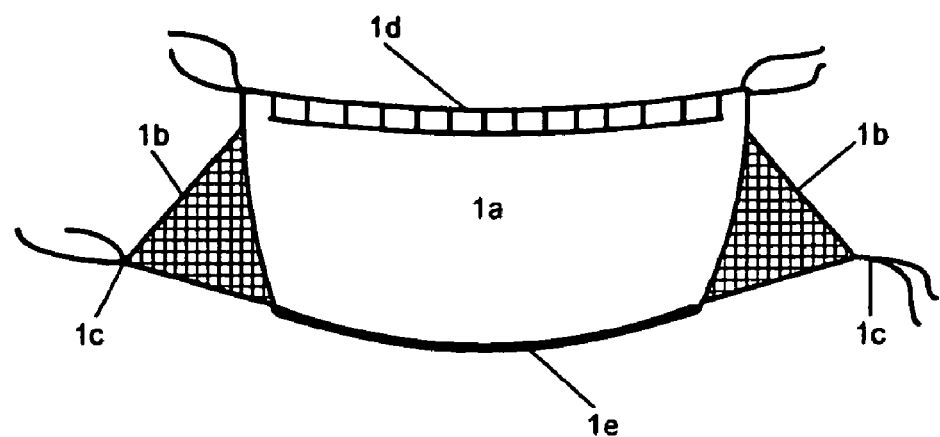
FIG. 1.
Flat view of cover.
1a. body of cover made from UPF 50+ rated stretch knit/woven breathable fabric
1b. translucent mesh sides for viewing and cross ventilation
1c. fasteners: hook/loop, Velcro, fabric ties, elastic
1d. elastic to secure cover to hood
1e. shaping means—PVC rod, stretch wire, malleable wire, casing
FIG. 2.
Cover attached to stroller
a. body of cover attached to stroller showing frustum shape.
b. translucent mesh sides provide air flow and viewing for occupant
c. ties/fasteners
d. elastic
e. shaping means—pvc rod, stretch wire, malleable wire, casing.

Referring to the drawings and in particular FIG. 1 (cover flat and unattached to hood, showing shape and detail) the invention provides a device for shielding an occupant in a hooded carriage/stroller, car seat or jogger from direct sunlight/light rain and therefore protects the occupant from UV rays. The device includes a flexible UV cover configured so that on attachment to a hooded carriage, stroller, car seat or jogger, it defines a shaded area. The flexible UV protective cover has two transparent mesh sides/arms/windows that provide for viewing, ventilation and stability against the wind.

FIG. 1. The said cover comprises of 1a. Main body made from UPF50+ rated knitted or woven stretch fabric, preferring but not limited to micro fiber—polyester, 1b. Transparent wings/arms/windows, made from, but not limited to mesh providing 70% sun protection, 1c. Ties —fabric ties, Velcro, hook and loop, elastic webbing any of a plethora of configurations that can secure cover to frame of stroller, 1d. Elastic to keep cover secured to hood, 1e. Shaping means including but not limited to; pvc coated wire, stretch wire, cable covering, cable and spring wire.

Figure 2:
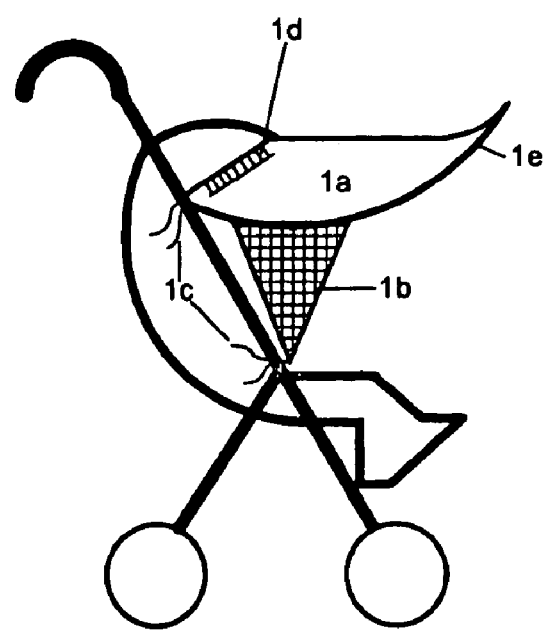

FIG. 2. Shows the cover attached to a hooded stroller. As shown in FIG. 2., the leading edge of the cover can include a shaping component that forms an upturned leading edge. Just like the discussion of the shaping means described in FIG. 1., the shaping component can include pvc coated wire, stretch wire, cable covering, cable and spring wire.

By showing only FIG. 2 we are not limiting the use of the cover to this type of stroller, the cover can be used in the following embodiments: for all hooded strollers, hooded carriages, hooded joggers, any hooded devised used for transporting baby, infant or toddler. It can also be used on baby car seats, for use in and outside of the car. The cover also comes in twin side by side embodiment for hooded strollers, hooded carriages, and hooded jogger. It can also be used on tandem strollers.

The cover in its present invention has been designed to assist in the protection of babies and young children while they are exposed to the dangers of the sun. The cover is preferably manufactured from a UPF50+ rated fabric, ensuring high level of protection from the sun's rays.

The protective device easily attaches to most hooded prams, strollers, carriages, joggers and car seats by simply placing the elastic attachment means over the edge of the hood and securing the ties to the frame.

Advantageously, the cover is washable.

Although the invention has been described with reference to specific examples, it will be appreciated by those skilled in the art that the invention may be embodied in many other forms.

We claim:

1. A ventilated sun shield comprising a UPF 50+ protective sun shield cover configured to be attached to a stroller canopy, said sun shield cover comprising a shaping component that forms an upturned leading edge, said sun shield cover having mesh sides disposed at opposite ends of said sun shield cover, each of said mesh sides permitting passage of air from one side of said sun shield cover to another side of said sun shield cover.

2. The ventilated sun shield of claim 1, wherein said shaping component comprises an elasticized rod.

3. The ventilated sun shield of claim 1, wherein said shaping component comprises a polyvinylchloride coated wire.

4. The ventilated sun shield of claim 1, wherein said shaping component comprises a spring wire.

5. The ventilated sun shield of claim 1, wherein each of said mesh sides comprises an attachment means for fastening said suns shield cover to a baby transport.

6. The ventilated sun shield of claim 5, wherein said baby transport comprises a transport selected from the group consisting of a stroller, a jogger and a car seat.

7. The ventilated sun shield of claim 5, wherein said attachment means comprises elastic straps.

8. The ventilated sun shield of claim 5, wherein said attachment means comprises fabric ties.

9. The ventilated sun shield of claim 5, wherein said attachment means comprises hook and loop fasteners.

* * * * *